(No Model.) 7 Sheets—Sheet 1.

E. WAGEMANN.
FIELD MAGNET FOR DYNAMOS.

No. 429,490. Patented June 3, 1890.

Witnesses:
D. W. Gardner
Nellie L. Pope

Inventor:
Edmund Wagemann
By his Attorney,
Edward P. Thompson (No Model.) 7 Sheets—Sheet 4.

E. WAGEMANN.
FIELD MAGNET FOR DYNAMOS.

No. 429,490. Patented June 3, 1890.

Witnesses:
D. W. Gardner
Kellie L. Pope

Inventor:
Edmund Wagemann
By his Attorney
Edward P. Thompson (No Model.) 7 Sheets—Sheet 5.
E. WAGEMANN.
FIELD MAGNET FOR DYNAMOS.

No. 429,490. Patented June 3, 1890.

Witnesses:
D. W. Gardner
Nellie L. Pope

Inventor:
Edmund Wagemann
By his Attorney,
Edward P. Thompson (No Model.) 7 Sheets—Sheet 6.
E. WAGEMANN.
FIELD MAGNET FOR DYNAMOS.

No. 429,490. Patented June 3, 1890.

Witnesses:
D. W. Gardner
Hellus L. Pope

Inventor:
Edmund Wagemann
By his Attorney,
Edward P. Thompson (No Model.) 7 Sheets—Sheet 7.
E. WAGEMANN.
FIELD MAGNET FOR DYNAMOS.
No. 429,490. Patented June 3, 1890.
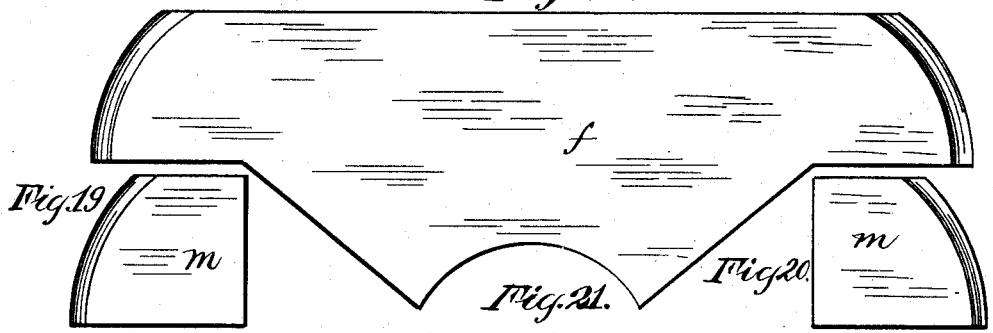
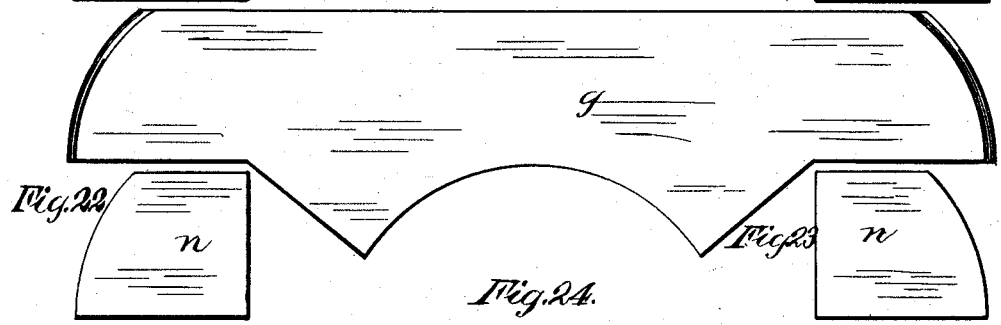
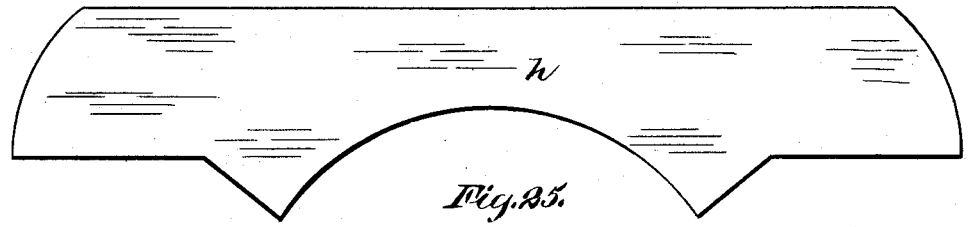
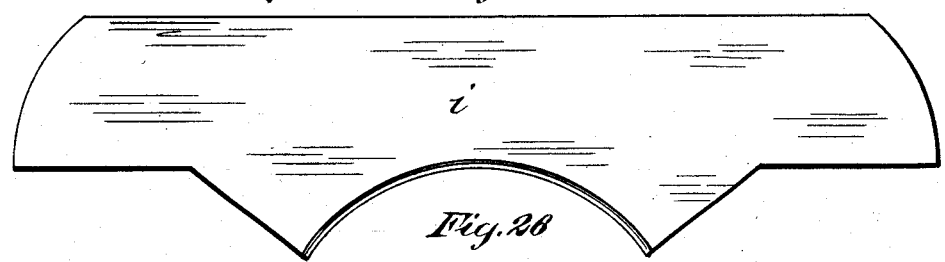
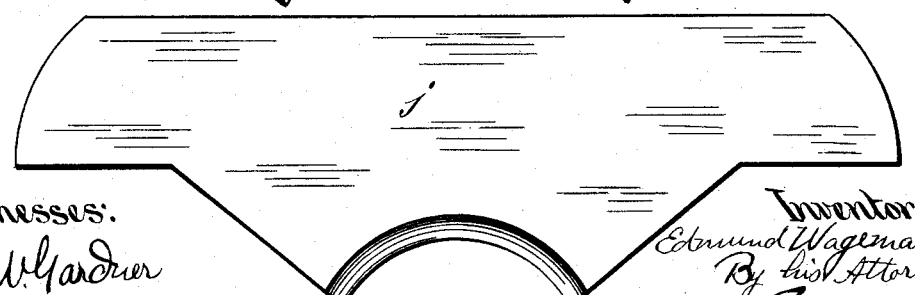
Witnesses:
D. W. Gardner
Nellie L. Pope
Inventor:
Edmund Wagemann
By his Attorney
Edward P. Thompson

UNITED STATES PATENT OFFICE.

EDMUND WAGEMANN, OF LITTLE ROCK, ARKANSAS, ASSIGNOR OF SIX-SEVENTHS TO JOHN D. ADAMS, DEAN ADAMS, OSCAR DAVIS, JOHN W. DAVIS, HORACE G. ALLIS, AND JOHN B. JONES, ALL OF SAME PLACE.

FIELD-MAGNET FOR DYNAMOS.

SPECIFICATION forming part of Letters Patent No. 429,490, dated June 3, 1890.

Application filed September 16, 1889. Serial No. 324,151. (No model.)

*To all whom it may concern:*

Be it known that I, EDMUND WAGEMANN, a subject of the Emperor of Germany, and a resident of Little Rock, county of Pulaski, and State of Arkansas, have invented certain new and useful Improvements in Field-Magnets of Dynamos, of which the following is a specification.

My present invention relates to the mechanical construction of field-magnets for dynamos or electric motors.

The object of the invention is to provide a field-magnet embodying a core simple in construction and efficient in concentration of the lines of magnet force to the armature-coils.

The details are fully set forth in the accompanying drawings, in which—

Figure 1:
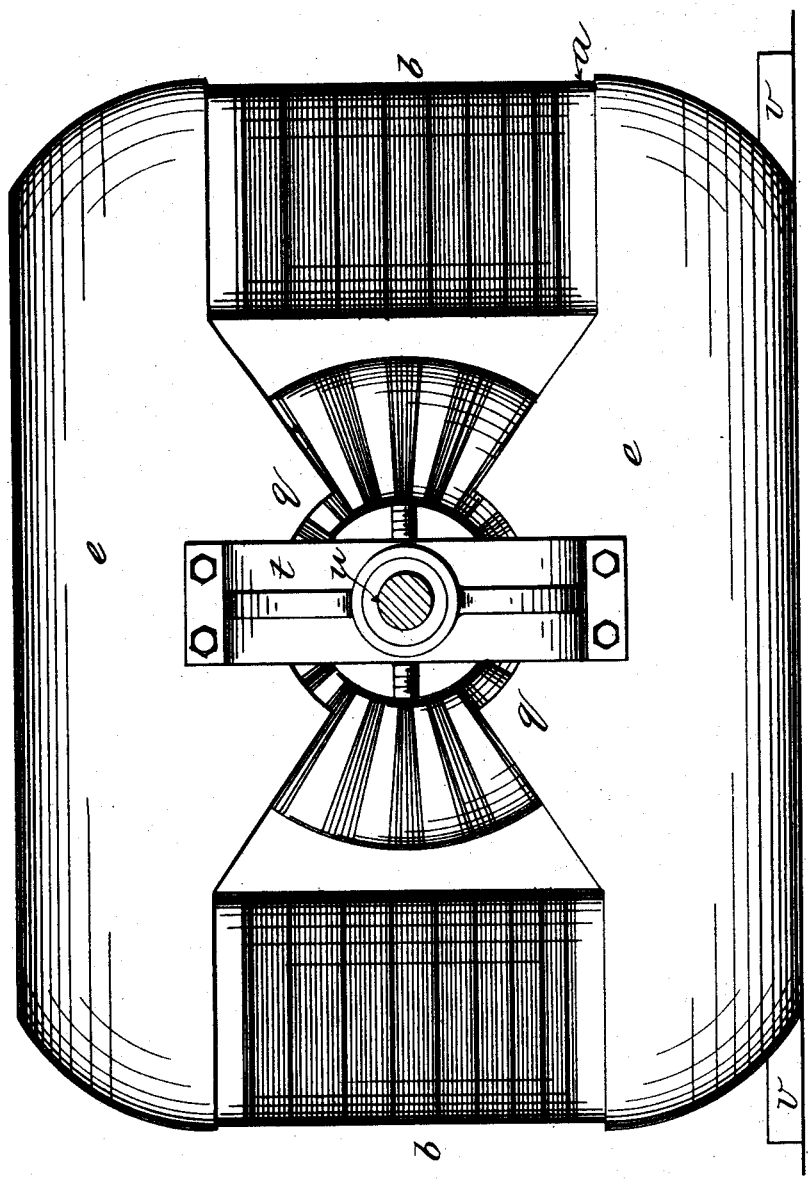
Figure 2:
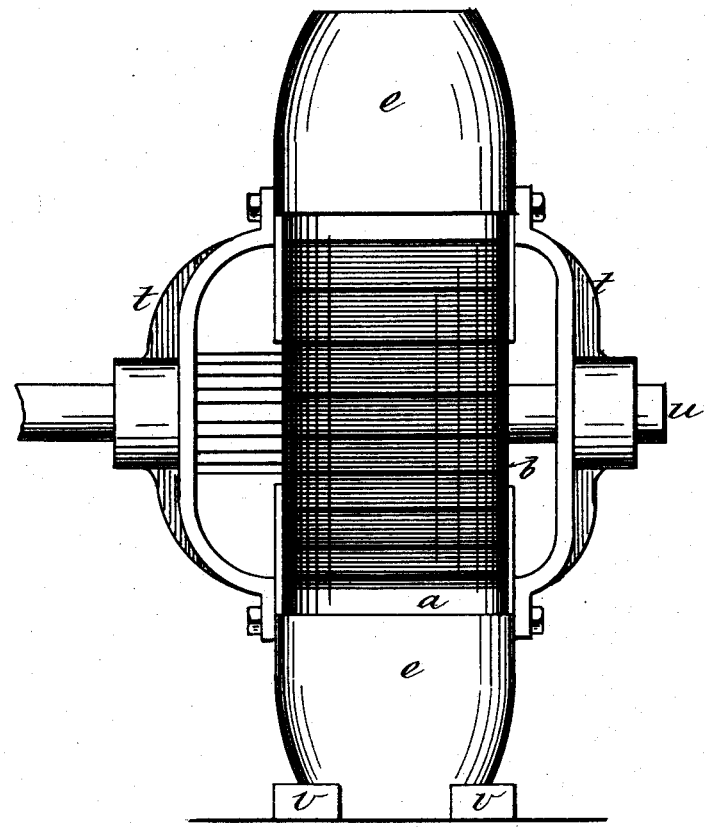
Figure 3:
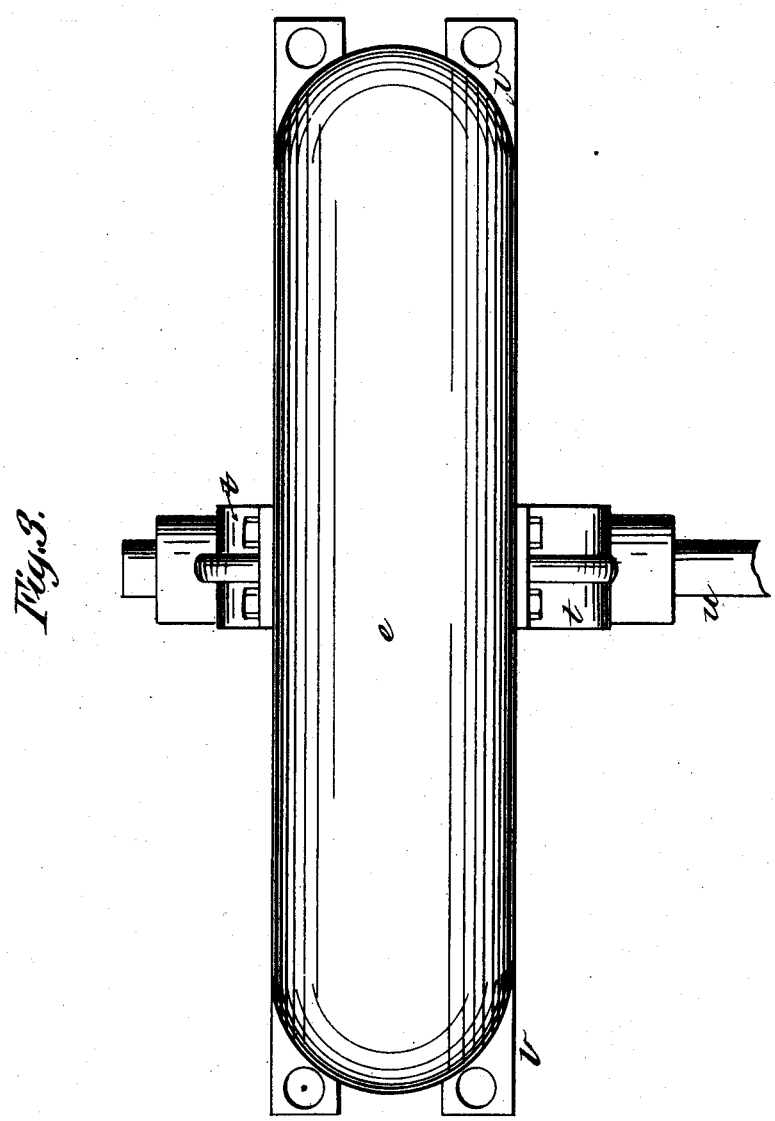
Figure 4:
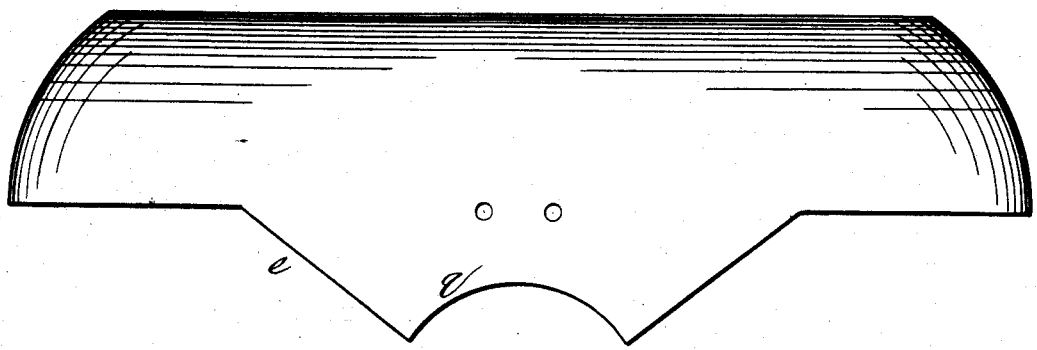
Figure 5:
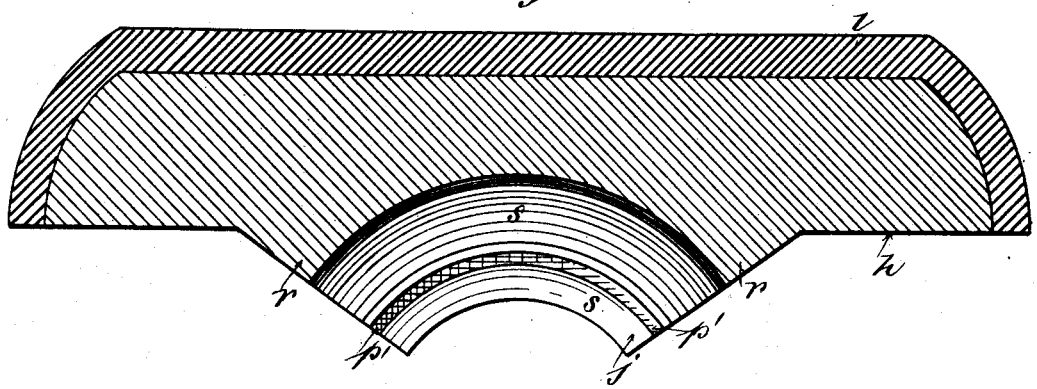
Figure 6:
Figure 7:
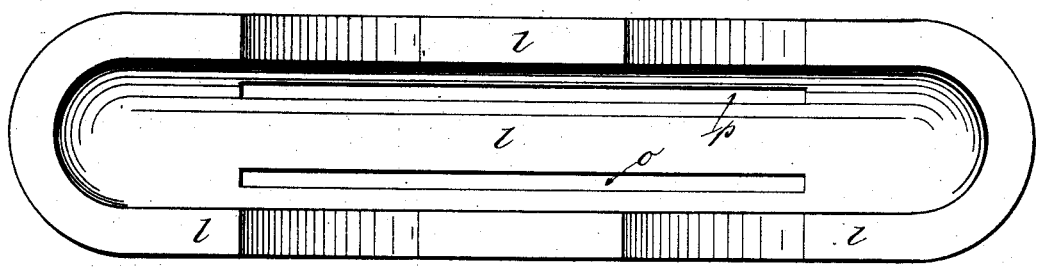
Figure 8:
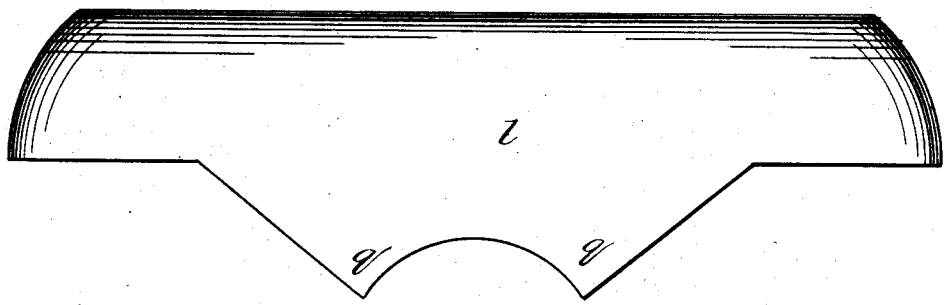
Figure 9:
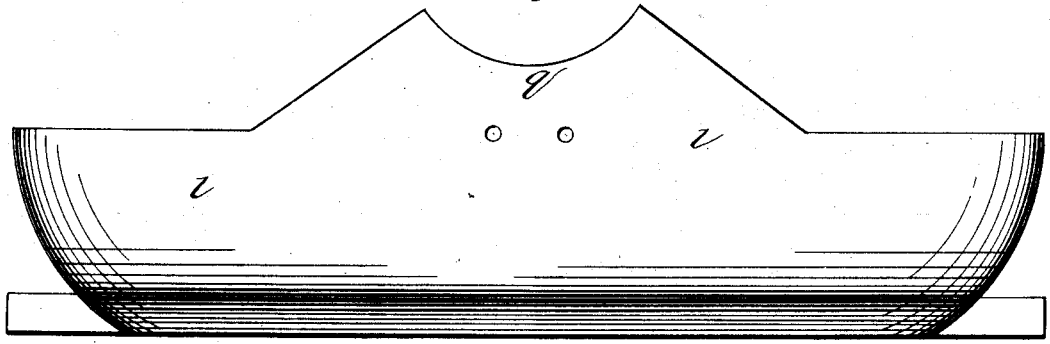
Figure 10:
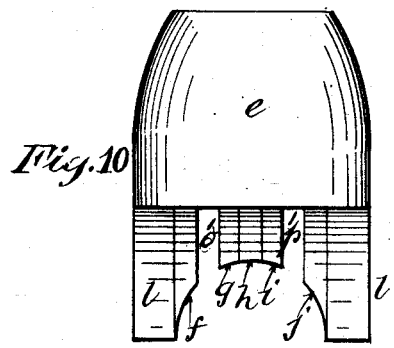
Figure 11:
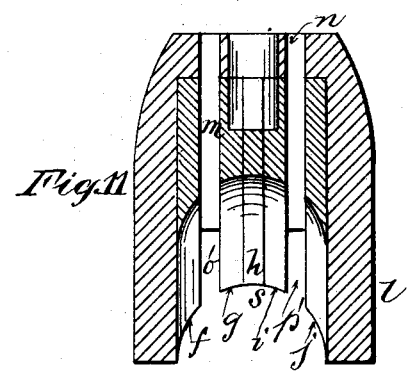
Figure 12:
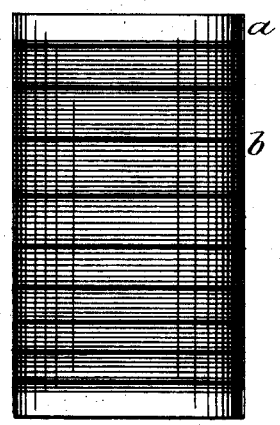
Figure 13:
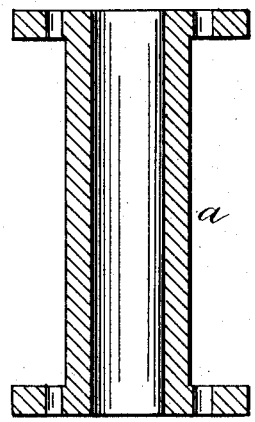
Figure 14:
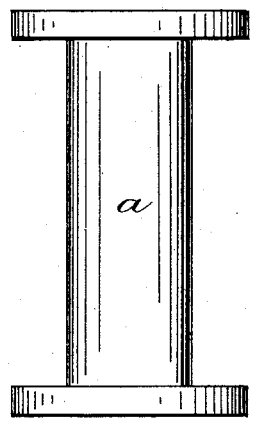
Figure 15:
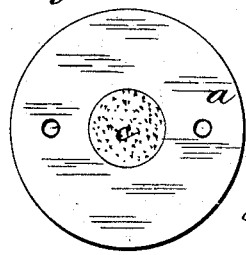
Figure 16:
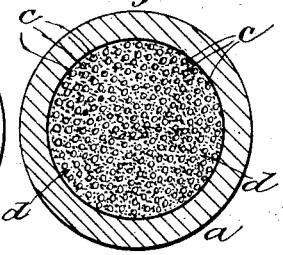
Figure 17:
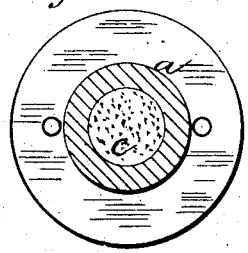

Figure 1 is a front elevation of the complete invention, showing also the armature and brackets for holding the same. Fig. 2 is a side elevation of the device seen in Fig. 1. Fig. 3 is a plan view of Figs. 1 and 2. Figs. 4 and 6 are different rectangular views of the complete upper pole-piece of the field-magnet. Fig. 5 shows a sectional view of a pole-piece constructed after the manner of my invention. The space $p'$ is that space between the plates $i$ and $j$, as seen in Figs. 10 and 11, hereinafter alluded to, except that in Fig. 5 the plates $g$, $h$, and $i$ are thicker than in plates 10 and 11, while the plates $f$ and $j$ are thinner than in those figures, so that the space $p'$ in Fig. 5 appears at the lower part of the torus-shaped groove or ring-shaped groove $s$. By this construction the grooves $p$ and $o$ would be brought farther to the edges of the field-magnet's shell in Fig. 7. Figs. 7, 8, and 9 are similar views of the shell of cast-iron forming a part of the pole-piece. Figs. 10 and 11 are views in end elevation and cross-section of Fig. 4. Fig. 12 is an exterior view of the field-magnet coil, Fig. 13 of the spool in longitudinal section, and Fig. 14 an exterior elevation of the same spool for containing the coil. Figs. 15, 16, and 17 are respectively an end view of Fig. 12, a magnified view of the wire and filling core of the coil, and a cross-sectional view of Fig. 14. Figs. 18, 19, 20, 21, 22, 23, 24, 25, and 26 are views of the superposed wrought-iron plates, which are principally surrounded by a shell of cast-iron.

The device embodying my invention consists of the combination of two spools $a$, provided with coils $b$ wound upon the outside of the same. A group of wires $c$ placed within the hollow or tubular portion of said spool, the interstices between the wire being filled with iron filings $d$, (see Fig. 16,) two pole-pieces $e$, joining opposite ends of the spools and pressing upon the same, so as to prevent the wires and filings from falling out of the spools, the said pole-pieces consisting of the combination of superposed wrought-iron plates $f$, $g$, $h$, $i$, $j$, $m$, and $n$, (shown separately in Figs. 18, 19, 20, 21, 22, 23, 24, 25, and 26,) and a shell of cast-iron $l$, surrounding all but the outer edge of the said wrought-iron plates. These plates are laid together and the shell of iron is cast about the same. The shell has two openings $o$ and $p$, and these holes coincide with spaces $o'$ $p'$ between the plates $f g$ and $i j$, respectively. The plates $f g h i j$ are of similar form, but of slightly different size, to fit the shell whose shape is preferably of the shape of a semi-cylinder, hollow, and provided with polar extensions $q$, which hang over the armature, as seen in Fig. 1. The plates $m$ and $n$ fit in between the ends of the plates $f g$ and $i$ and $j$, thereby leaving the spaces $o'$ and $p'$ for ventilation. The polar extensions of the plates $f g h i j$ are of varying size, so as that the armature may fit loosely in a partially-cylindrical ring-groove $s$ in the pole-pieces considered as a whole. The said polar extensions extend toward the ends of the pole-pieces, but leave enough room to lap over the ends of the spools $a$. The pole-pieces are, in consequence of the above construction, as strong as cast-iron, and yet the iron is in the form of wrought-iron and in laminæ. The thickness of the cast-iron is magnified in the drawings for the sake of more distinct illustration; but in practice it may be only one-eighth inch thick. The advantage of the wrought-iron is its great purity as compared to cast-iron. All the advantages of wrought-iron are obtained and yet the pole-pieces are as stiff and rigid as if made of cast-iron. Further, no bolts are needed to hold the sheets of wrought-iron together, as the shell contracts in cooling and grasps the sheets with great strength. The iron filings serve the purpose of filling up the waste space in the interstices between the iron wires in the spools. The pole-pieces pressing against the spools prevent the filings from dropping out. The filings also, by their rearrangement by magnetism, assist to concentrate the lines of force toward the pole-pieces. The pole-pieces are held together in their proper places by means of the brackets $t$, which form the bearings for the armature-shaft $u$. The brackets are bolted to both the upper and lower pole-pieces. The lower pole-piece is provided with suitable lugs $v$, to act as base-plates for the whole machine.

I claim as my invention—

1. In a field-magnet for a dynamo or motor, the combination of a magnet-coil wound upon a spool which is hollow, a bundle of iron wires filling the hollow part of the spool except for the usual interstices left between the wires, iron filings between the said wires, and pole-pieces for the machine and lapping over and pressing upon the ends of the spools and covering the said wires and filings.

2. In a field-magnet for dynamos or electric motors, the combination of magnet-coils and pole-pieces attached thereto, the said pole-pieces consisting of a mass of superposed sheet-iron plates, and a shell of cast-iron surrounding all but one edge of said mass.

3. In a field-magnet pole-piece, a shell surrounding superposed iron plates thereof, consisting of a hollow semi-cylindrical iron shell provided with holes.

In testimony that I claim the foregoing as my invention I have signed my name, in presence of two witnesses, this 22d day of August, 1889.

EDMUND WAGEMANN.

Witnesses:
E. G. DUVALL, Jr.,
NELLIE L. POPE.